(12) United States Patent
Matsushita et al.

(10) Patent No.: US 8,901,796 B2
(45) Date of Patent: Dec. 2, 2014

(54) ROTOR HAVING CONCENTRIC DEFORMATION ABSORBING PARTS AROUND SHAFT-FASTENING HOLE

(75) Inventors: Masayuki Matsushita, Nisshin (JP); Yasuyuki Satake, Nagoya (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 264 days.

(21) Appl. No.: 13/518,325

(22) PCT Filed: Dec. 23, 2009

(86) PCT No.: PCT/JP2009/071351
§ 371 (c)(1),
(2), (4) Date: Jun. 21, 2012

(87) PCT Pub. No.: WO2011/077522
PCT Pub. Date: Jun. 30, 2011

(65) Prior Publication Data
US 2012/0256516 A1 Oct. 11, 2012

(51) Int. Cl.
*H02K 1/27* (2006.01)
*H02K 1/28* (2006.01)

(52) U.S. Cl.
CPC ............... *H02K 1/2766* (2013.01); *H02K 1/28* (2013.01)
USPC ............. 310/156.57; 310/156.09; 310/156.53

(58) Field of Classification Search
CPC ............. H02K 1/28; H02K 1/30; H02K 1/27; H02K 1/2706; H02K 1/276
USPC .............. 310/156.57, 156.53, 156.08, 156.09
See application file for complete search history.

(56) References Cited

U.S. PATENT DOCUMENTS

2002/0079768 A1* 6/2002 Lai et al. ................... 310/156.12
2008/0224558 A1* 9/2008 Ionel ........................ 310/156.57

FOREIGN PATENT DOCUMENTS

| JP | 09-103061 A | 4/1997 |
| JP | 2002-354726 A | 12/2002 |
| JP | 2006-254662 A | 9/2006 |
| JP | 2006254662 A * | 9/2006 ............... H02K 1/30 |
| JP | 2008-154309 A | 7/2008 |
| JP | 2008-187804 A | 8/2008 |

OTHER PUBLICATIONS

Machine translation of JP2008-254662 (published: Sep. 2006).*
International Search Report of PCT/JP2009/071351 mailed Feb. 9, 2010.

* cited by examiner

*Primary Examiner* — Michael Andrews
(74) *Attorney, Agent, or Firm* — Kenyon & Kenyon LLP

(57) ABSTRACT

A rotor is provided with a rotor core, a shaft fastening hole provided at the center of the rotor core, and magnets provided to the outer circumferential portion of the rotor core. Circular arc slits are formed at intervals on double concentric circles, respectively, so as to be located around the shaft fastening hole of the rotor core. The slits are arranged in such a manner that the outside slits on the outer circle are each located so as to block the portions located in the intervals between adjacent inside slits on the inner circle.

4 Claims, 5 Drawing Sheets

ROTOR HAVING CONCENTRIC DEFORMATION ABSORBING PARTS AROUND SHAFT-FASTENING HOLE

CROSS-REFERENCE TO RELATED APPLICATIONS

This is a 371 national phase application of PCT/JP2009/071351 filed on 23 Dec. 2009, the entire contents of which are incorporated herein by reference.

FIELD OF THE INVENTION

The present invention relates to a rotor to be used for a motor and more particularly to a rotor including a rotor core, a shaft-fastening hole provided at the center of the rotor core, and a magnet provided in an outer circumferential portion of the rotor core.

BACKGROUND OF THE INVENTION

This type of technique is conventionally known as for example a rotor disclosed in Patent document 1 listed below. This rotor includes a rotor core, a shaft hole (a shaft-fastening hole) provided at the center of the rotor core, a rotary shaft (a rotor shaft) inserted in the shaft-fastening hole by interference fit, through holes formed to prevent magnetic flux leakage on both wing portions of the rotor core, rectangular slots formed in separate right and left slots between the through holes to leave a central portion of the rotor core, rectangular field permanent magnets fitted in the slots, salient poles portion formed above the permanent magnets, and bridges to connect the salient poles and the rotor core between the slots.

Herein, a plurality of nearly arc-shaped slits are formed between the through holes and the shaft-fastening hole. It is configured such that the thickness in a radial direction between the inner circumference of each slit and the shaft-fastening hole is equal to the thickness in the radial direction between the inner circumference of each slot and the shaft-fastening hole. Accordingly, when the rotor used in the motor is rotated at high speeds, deformation of the rotor core due to interference fit between the shaft-fastening hole and the rotor shaft is reduced by those slits. This reduces concentration of stress on thin portions.

RELATED ART DOCUMENTS

Patent Documents

Patent Document 1: JP-A-2002-354726
Patent Document 2: JP-A-9(1997)-103061

SUMMARY OF THE INVENTION

Problems to be Solved by the Invention

In the rotor disclosed in Patent document 1, however, a bridge also exists between adjacent slits in an outer circumferential portion of the rotor core. Thus, in association with interference fit of the rotor shaft to the shaft-fastening hole, the bridge portions are deformed, stress on the relevant portions may increase. When the rotor mounted in a motor is rotated at high speeds, furthermore, a centrifugal force may cause changes in the inner diameter of the shaft-fastening hole or deformation of the outer circumferential portion of the rotor core. Accordingly, the interference between the shaft-fastening hole and the rotor shaft decreases, leading to a lower torque transmitted from the rotor core to the rotor shaft.

The present invention has been made in view of the circumstances and has a purpose to provide a rotor capable of preventing deformation of a stator rotor core outer circumferential portion by the interference between a shaft-fastening hole and a rotor shaft or of preventing decrease in the interference by centrifugal force.

Means of Solving the Problems (1) To achieve the above purpose, a first aspect of the invention provides a rotor including a rotor core, a shaft-fastening hole provided at a center of the rotor core, a plurality of slots provided in an outer circumferential portion of the rotor core, and magnets individually mounted in the slots, wherein the slots are arranged along an outer circumferential edge of the rotor core so that adjacent two slots are oriented in a reversed separated V shape or a separated V shape, each portion located in an interval between the adjacent slots forms an outer circumferential bridge located close to an outer circumference of the rotor core and an inner circumferential bridge located close to an inner circumference of the rotor core, wherein a plurality of slits each having an arc shape are formed at intervals on each of multiple concentric circles around the shaft-fastening hole and between the shaft-fastening hole and the slots of the rotor core, and the slits located on adjacent concentric circles are arranged so that the slits on one of the circles are placed to block portions located in the intervals between the slits on the other circle, wherein, assuming that the portions located in the intervals between the slits formed on an outermost circle of the multiple concentric circles form a plurality of outside bridges and the portions located in the intervals between the slits formed on a circle positioned more inside than the outermost circle form a plurality of inside bridges, the inside bridges are arranged in line, in a radial direction of the rotor core, with the outer circumferential bridges provided between the slots and the outside bridges are arranged in line, in the radial direction of the rotor core, with the inner circumferential bridges provided between the slots.

According to the above configuration (1), a deformation absorbing part having a nearly annular shape and being able to absorb deformation of the rotor core in the radial direction is formed around the shaft-fastening hole of the rotor core and between the slits formed on an innermost circle and the slits formed on an outermost circle of multiple concentric circles. Accordingly, this deformation absorbing part absorbs a change in interference when the rotor shaft is inserted by interference fit in the shaft-fastening hole and a change in inner diameter of the shaft-fastening hole due to centrifugal force applied on the rotor core. Herein, of the slits on adjacent concentric circles, the slits in one of the circles are placed to block portions located in the intervals between the slits on the other circle. Consequently, even when the deformation in the radial direction of the center part of the rotor core influences on the portions located in the intervals between the slits on the inner circle, such deformation can be absorbed by the slits located on the outer circle to block the portions present in the intervals.

(2) To achieve the above object, in the above configuration (1), preferably, each of the slits has arc-shaped end portions at both ends in its longitudinal direction.

According to the above configuration (2), in addition to the operations in (1), even when each slit is deformed in association with deformation of the deformation absorbing part, stress concentration on the both end portions of each slit can be reduced by the arc shape.

(3) To achieve the above object, the above configuration (1) or (2) preferably further includes a rotor shaft fastened in the shaft-fastening hole, wherein the rotor shaft is fitted in the shaft-fastening hole by protrusion and recess engagement.

According to the above configuration (3), in addition to the operations in (1) or (2), the rotor shaft is fitted in the shaft-fastening hole by the protrusion and recess engagement, so that connecting strength between the rotor shaft and the rotor core can be enhanced.

Effects of the Invention

The above configuration (1) can avoid deformation of the outer circumferential portion of the rotor core due to the interference between the shaft-fastening hole and the rotor shaft or prevent decrease in interference due to centrifugal force applied on the rotor core.

The above configuration (2) can enhance durability of both end portions of each slit against loads repeatedly applied thereon, as well as the effects of the configuration (1).

The above configuration (3) can enhance a torque transmitting function from the rotor core to the rotor shaft, as well as the effects of the configuration (1) or (2).

DETAILED DESCRIPTION

First Embodiment

A detailed description of a first preferred embodiment of the present invention will now be given referring to the accompanying drawings.

Figure 1:
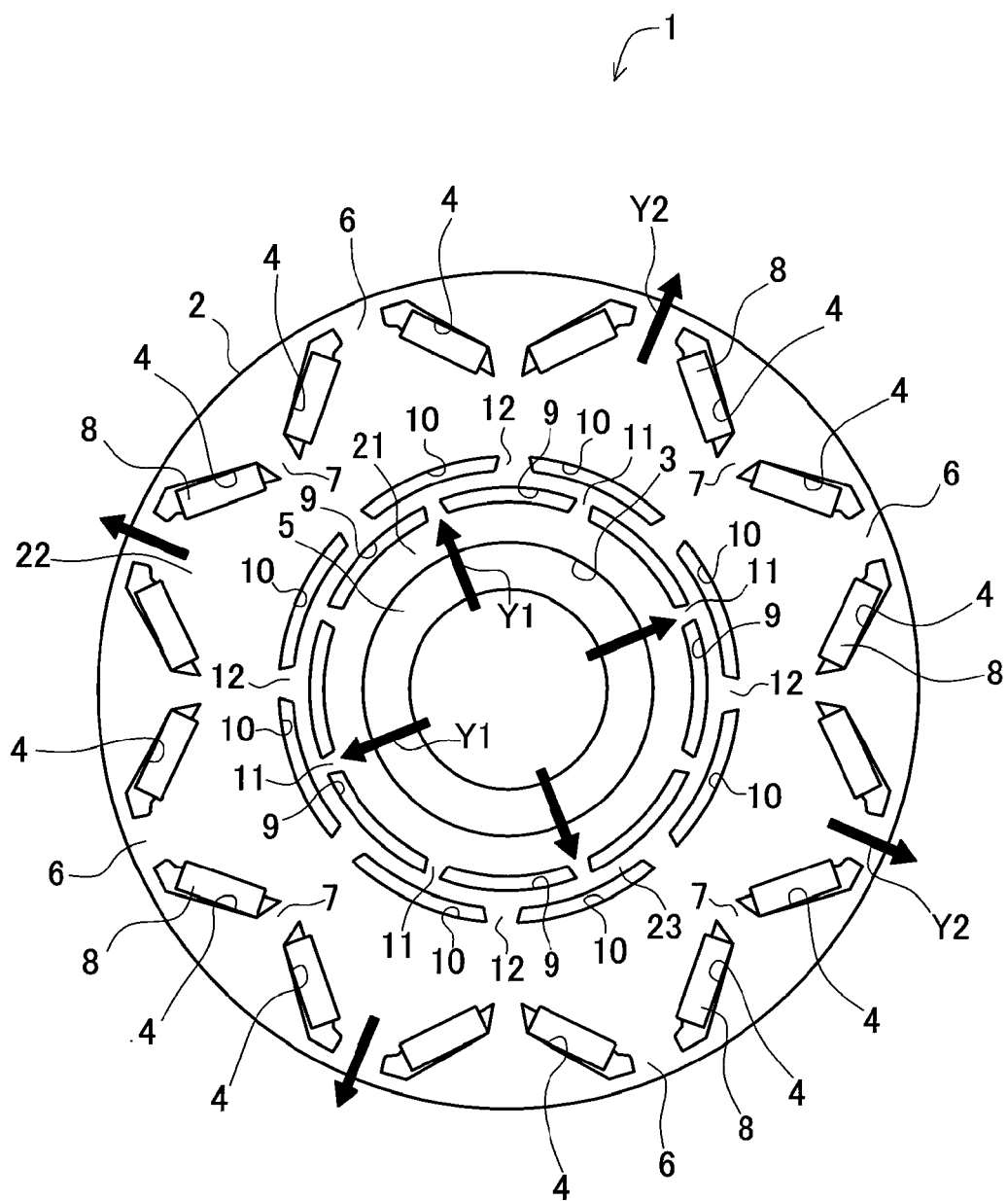
FIG. 1 is a plan view of a rotor in a first embodiment.

FIG. 1 is a plan view of a rotor 1 in this embodiment. This rotor 1 includes a rotor core 2, a single shaft-fastening hole 3 formed at the center of the rotor core 2, and a plurality of slots 4 formed in an outer circumferential portion of the rotor core 2. The rotor core 2 is made of a plurality of laminated magnetic steel sheets. A cylindrical rotor shaft 5 is inserted by interference fit in the shaft-fastening hole 3. The slots 4 are arranged along the outer circumferential edge of the rotor core 2 so that adjacent two slots 4 are oriented in the form of a reversed separated V shape or a separated V shape. Each portion located in an interval between the adjacent slots 4 forms an outer circumferential bridge 6 or an inner circumferential bridge 7. In the slots 4, field permanent magnets 8 are individually fitted and fixed.

Around the shaft-fastening hole 3 of the rotor core 2, between the shaft-fastening hole 3 and the slots 4, a plurality of inside slits 9 and a plurality of outside slits 10, each of the slits having a circular arc shape, are formed on concentric double circles. Each portion located in an interval between the inside slits 9 forms an inside bridge 11. Each portion located in an interval between the outside slits 10 forms an outside bridge 12. The outside slits 10 are placed outside the inside slits 9 to block the corresponding inside bridges 11, that is, to correspond with the bridges 11.

The inside bridges 11 are arranged in line, in the radial direction, with the outer circumferential bridges 6 provided between the slots 4. In contrast, the outside bridges 12 are arranged in line, in the radial direction, with the inner circumferential bridges 7 provided between the slots 4.

Each adjacent two of the permanent magnets 8 form a pair of poles. Herein, the number of the inside slits 9 and the number of the outside slits 10 are set to be equal to the number of poles provided by the permanent magnets 8. In the present embodiment, specifically, the number of poles provided by the permanent magnets 8 is eight and thus the number of the inside slits 9 and the number of the outside slits 10 are equally eight.

Figure 2:
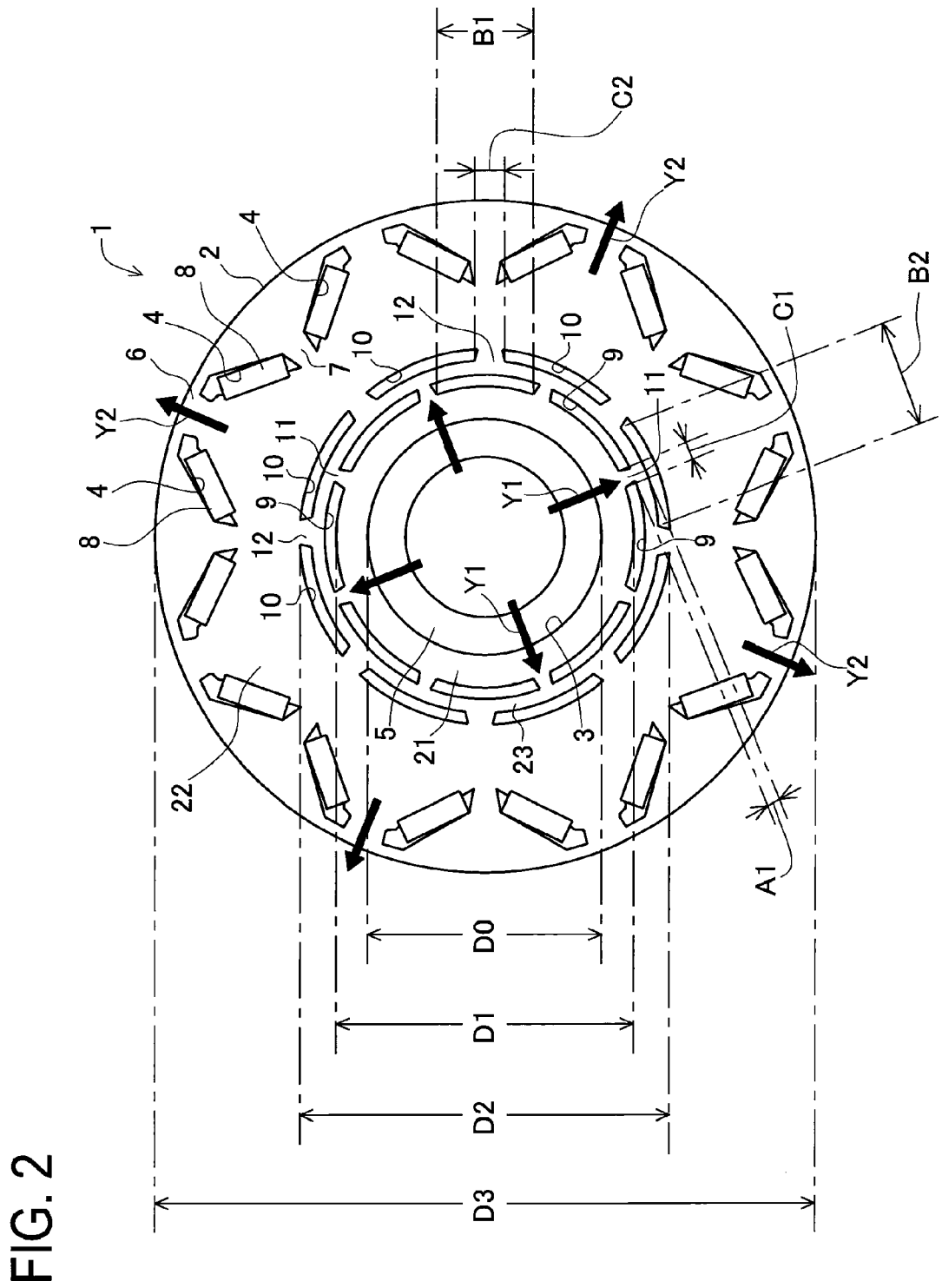
FIG. 2 is a plan view showing a relationship in size between every part of the rotor, etc. in the first embodiment.

FIG. 2 is a plan view showing a relationship in size between every part, etc. in the rotor 1 of the present embodiment. In FIG. 2, the inner diameter of the shaft-fastening hole 3 is assumed as D0, the inner diameter of the inside slits 9 is assumed as D1, the outer diameter of the outside slits 10 is assumed as D2, and the outer diameter of the rotor core 2 is assumed as D3. In FIG. 2, further, an interval between an inside slit 9 and an outside slit 10 adjacent in the radius direction is assumed as A1.

In the present embodiment, a portion between the inner diameter D0 of the shaft-fastening hole 3 and the inner diameter D1 of the slits 9 is referred to as a core inside annular portion 21. This annular portion 21 is configured to have a predetermined size to achieve required fastening strength by interference fit in order to fix the rotor shaft 5 in the shaft-fastening hole 3.

Furthermore, a portion between the outer diameter D2 of the outside slits 10 and the outer diameter D3 of the rotor core 2 is referred to as a core outside annular portion 22. This annular portion 22 receives a centrifugal force when the rotor 1 mounted in a motor is rotated at high speeds. The core outside annular portion 22 is designed so that, while an estimated centrifugal force acts on the annular portion 22, the stress applied on the inner circumferential bridges 7 and the outer circumferential bridges 6 is a permissible level or less.

A portion between the core inside annular portion 21 and the core outside annular portion 22, i.e., between the inner diameter D1 of the inside slits 9 and the outer diameter D2 of the outside slits 10 is referred to as a thin annular portion 23. This thin annular portion 23 functions as a deformation absorbing part to absorb deformation of the rotor core 2 in the radial direction. The thin annular portion 23 includes a portion corresponding to the interval A1 as shown in FIG. 2. The thin annular portion 23 has a plate spring function of being warped by internal or external force applied thereon.

In FIG. 2, of the thin annular portion 23, the width of a portion corresponding to the outer circumference of one inside slit 9 is assumed as B1 and the width of a portion corresponding to the inner circumference of one outside slit 10 is assumed as B2. The circumferential width of each inside bridge 11 is assumed as C1 and the circumferential width of each outside bridge 12 is assumed as C2. Each outside bridge 12 is positioned in line with the center of the width B1. Each inside bridge 11 is positioned in line with the center of the width B2. Of the thin annular portion 23, the substantial width of each portion corresponding to the width B1 is defined by "B1−C2" and the substantial width of each portion corresponding to the width B2 is defined by "B2−C1". Those widths "B1−C2" and "B2−C1" and the interval A1 are set to have a spring constant and an elastic-region deforming function whereby the interference of the shaft-fastening hole 3 and the deformation of the rotor core 2 in the radiation direction by the centrifugal force can be absorbed respectively.

In FIGS. 1 and 2, thick arrows Y1 indicated around the center of the rotor core 2 represent input of acting force to the rotor core 2 by the interference of the shaft-fastening hole 3. Similarly, in FIGS. 1 and 2, thick arrows Y2 indicated around the outer circumferential edge of the rotor core 2 represent centrifugal forces generated when the rotor 1 is rotated at high speeds.

According to the rotor 1 of the present embodiment explained as above, the thin annular portion 23 functioning as the deformation absorbing part to absorb deformation of the rotor core 2 in the radial direction is formed in an approximate annular shape around the shaft-fastening hole 3 of the rotor core 2 and between the inside slits 9 arranged on an inner circle and the outside slits 10 arranged on an outer circle. Therefore, the thin annular portion 23 can absorb a change in interference when the rotor shaft 5 is inserted by interference fit in the shaft-fastening hole 3 or a change in inner diameter of the shaft-fastening hole 3 due to the centrifugal force on the rotor core 2 generated when the rotor 1 mounted in a motor is rotated at high speeds.

In the present embodiment, the outside slits 10 are arranged to block (to correspond with) the inside bridges 11 each located between the inside slits 9. Accordingly, even when the deformation in the radial direction of the central portion of the rotor core 2 influences over the inside bridges 11, the deformation of the bridges 11 is absorbed by the outside slits 10 placed to block the inside bridges 11. This can avoid the deformation of the outer circumferential portion of the rotor core 2 due to the interference between the shaft-fastening hole 3 and the rotor shaft 5 or prevent the decrease of interference caused by the centrifugal force. Furthermore, since the deformation of the outer circumferential portion of the rotor core 2 can be avoided, the increase of stress on the outer circumferential bridges 6 and the inner circumferential bridges 7 of the rotor core 2 can be greatly restrained.

Second Embodiment

A second embodiment of a rotor of the present invention will be explained below in detail referring to the accompanying drawings.

The following explanation is given with a focus on differences from the first embodiment and with the same reference signs to similar or identical parts to those in the first embodiment without repeating their details.

Figure 3:
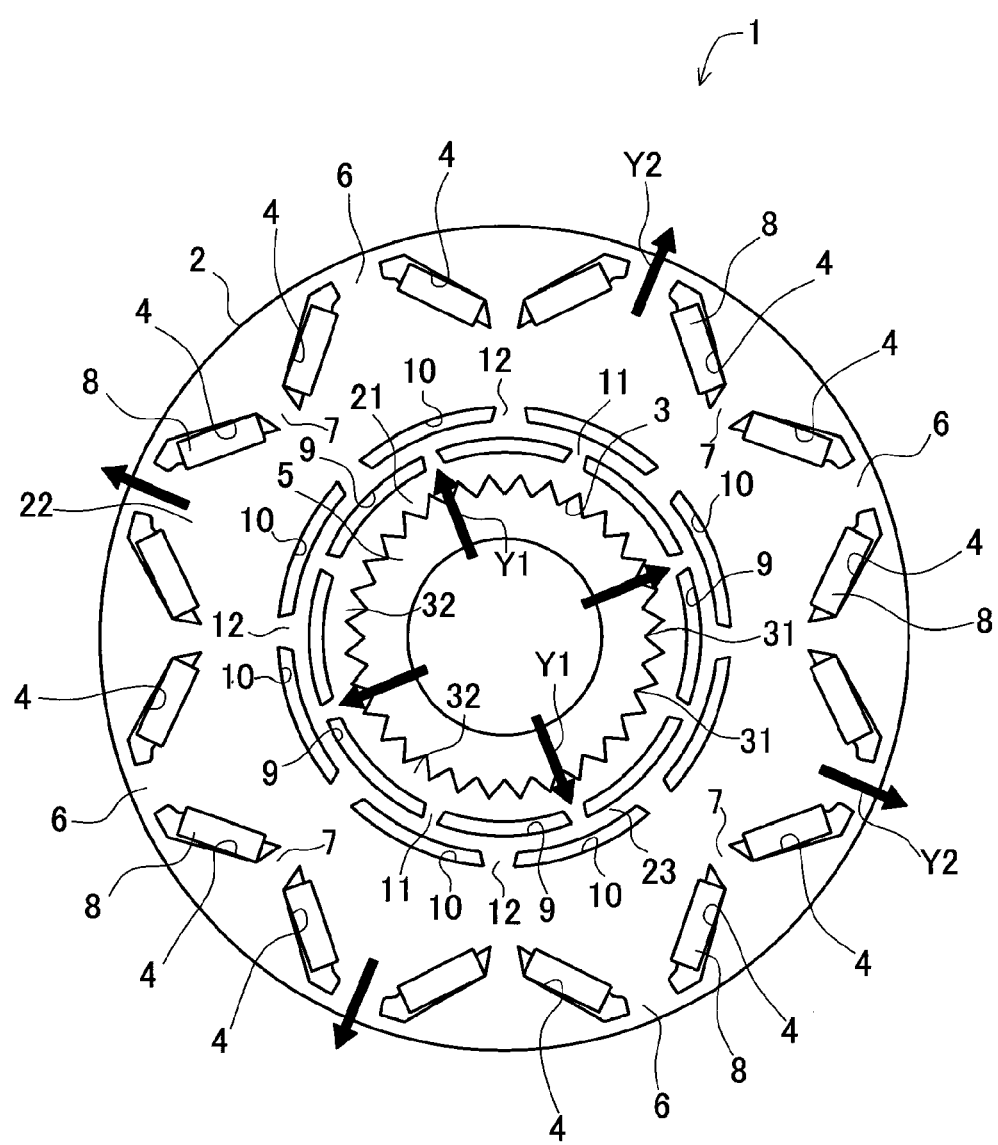
FIG. 3 is a plan view of a rotor in a second embodiment.

FIG. 3 is a plan view of the rotor 1 of this embodiment. This embodiment differs from the first embodiment in configurations of the shaft-fastening hole 3 and the rotor shaft 5. Specifically, in this embodiment, as shown in FIG. 3, the rotor shaft 5 is fitted in the shaft-fastening hole 3 by protrusion and recess engagement. The rotor shaft 5 is formed of a spline shaft having an outer periphery formed with a number of V grooves 31 extending in a longitudinal direction. The shaft-fastening hole 3 has an inner surface formed with a number of angular keys 32 fittable with the V grooves 31 of the rotor shaft 5. Other configurations are identical to those in the first embodiment.

Consequently, the rotor 1 of the present embodiment can provide the same operations and effects as those in the first embodiment. In addition, since the rotor shaft 5 is fitted in the shaft-fastening hole 3 by the protrusion and recess engagement between the V grooves 31 and the angular keys 32, connecting strength between the rotor shaft 5 and the rotor core 2 is increased. Thus, a torque transmitting function from the rotor core 2 to the rotor shaft 5 can be enhanced.

Third Embodiment

A third embodiment of a rotor of the present invention will be explained below in detail referring to the accompanying drawings.

Figure 4:
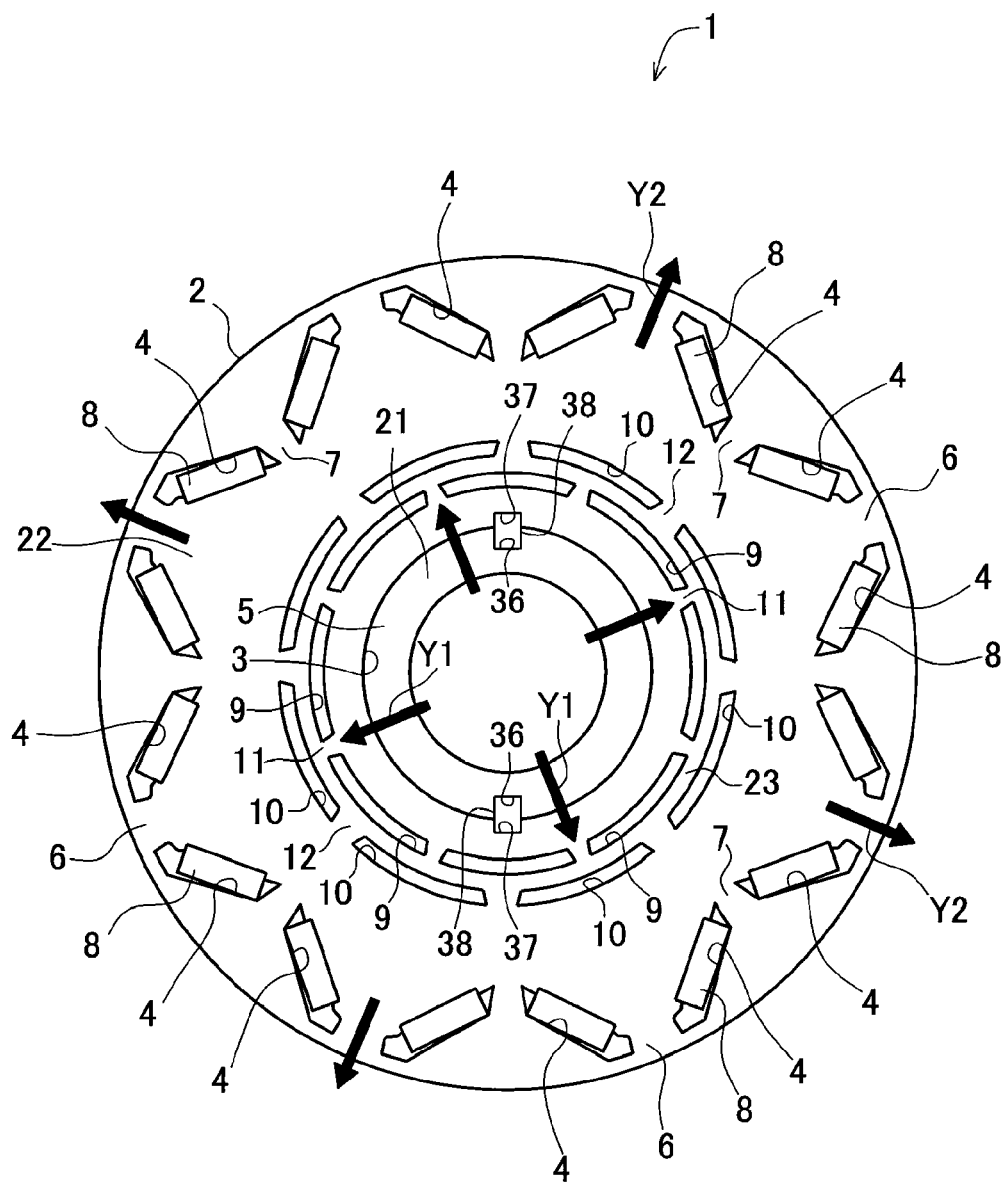
FIG. 4 is a plan view of a rotor in a third embodiment.

FIG. 4 is a plan view of the rotor 1 of the present embodiment. This embodiment also differs from the first embodiment in the configurations of a shaft-fastening hole 3 and a rotor shaft 5. In the present embodiment, specifically, as shown in FIG. 4, the rotor shaft 5 is formed with a pair of key grooves 36 each extending in a longitudinal direction on the outer periphery of the shaft 5 and similarly the shaft-fastening hole 3 is formed with a pair of key grooves 37 on an inner surface of the hole 3 in correspondence with the key grooves 36. Further, keys 38 are fitted between the key grooves 36 and 37 aligned with each other. In the above manner, the rotor shaft 5 is fitted in the shaft-fastening hole 3 by the protrusion and recess engagement. Other configurations are the same as those in the first embodiment.

Consequently, the rotor 1 of the present embodiment can provide the same operations and effects as those in the first embodiment. In addition, since the rotor shaft 5 is fitted in the shaft-fastening hole 3 by the protrusion and recess engagement between the keys 38 and the key grooves 36 and 37, the connecting strength between the rotor shaft 5 and the rotor core 2 can be increased. Thus, a torque transmitting function from the rotor core 2 to the rotor shaft 5 can be enhanced.

Fourth Embodiment

A fourth embodiment of a rotor of the present embodiment will be explained below in detail referring to the accompanying drawings.

Figure 5:
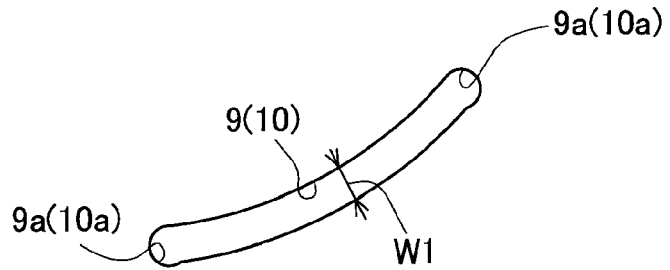
FIG. 5 is a plan view showing the shape of an inside slit and others in a fourth embodiment.

This embodiment differs from each of the aforementioned embodiments in the shape of inside slits 9 and outside slits 10 in the rotor core 2. FIG. 5 is a plan view showing the shape of one inside slit 9 (outside slit 10). This inside slit 9 (outside slit 10) has arc-shaped end portions 9a (10a) at both ends in a longitudinal direction. In this embodiment, the diameter of the arc shape is set to be almost equal to the width W1 of the inside slit 9 (outside slit 10).

In the present embodiment, accordingly, even when the inside slits 9 (outside slits 10) are deformed in association with deformation of the thin annular portion 23, the stress concentration on the end portions 9a (10a) of each inside slit 9 (10) is reduced owing to their arc shape. Therefore, both end portions 9a (10a) of each inside slit 9 (outside slit 10) can achieve higher durability against repeated loads.

The present invention is not limited to the aforementioned embodiments and may be embodied in other specific forms without departing from the essential characteristics thereof.

Figure 6:
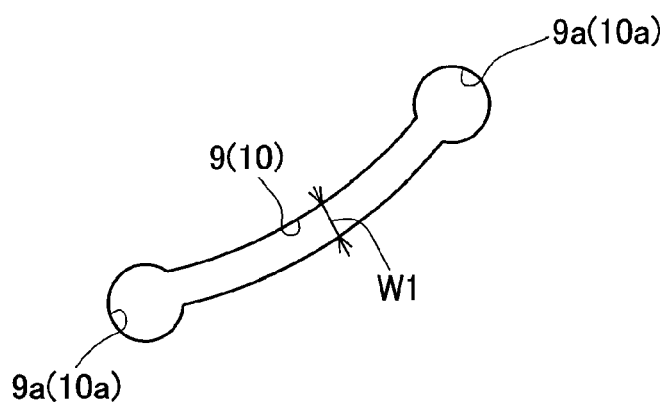
FIG. 6 is a plan view showing the shape of an inside slit and others in another embodiment.
Figure 7:
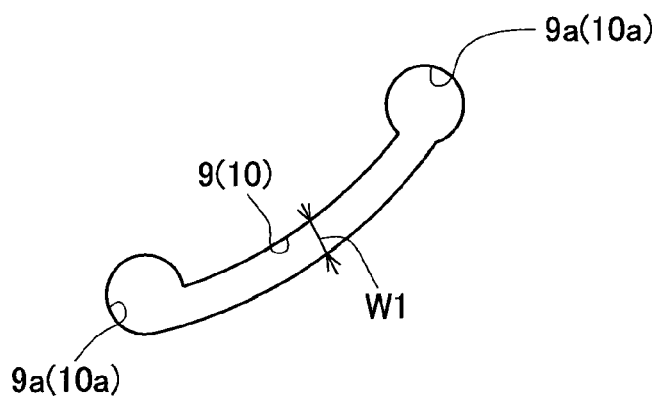
FIG. 7 is a plan view showing the shape of an inside slit and others in another embodiment.
Figure 8:
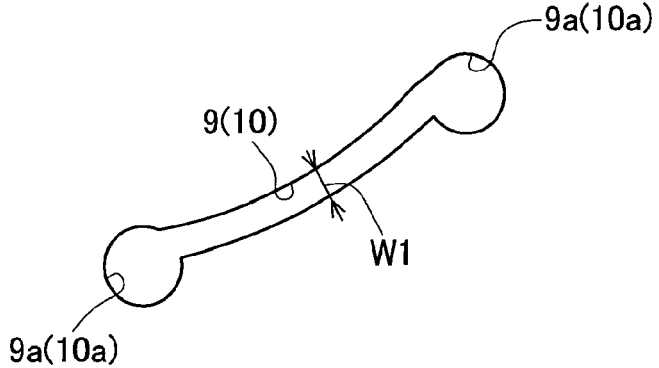
FIG. 8 is a plan view showing the shape of an inside slit and others in another embodiment.

(1) In the fourth embodiment, as shown in FIG. 5, the diameter of the arc shape of each end portion 9a (10a) of each inside slit 9 (outside slit 10) is set to be almost equal to the width W1 of each inside slit 9 (outside slit 10). An alternative is to form, as shown in FIG. 6, both end portions 9a (10a) of each inside slit 9 (outside slit 10) in a circular shape having a diameter nearly double the width W1 of each inside slit 9 (outside slit 10), and position the center of the circular shape on the circle on which the inside slits 9 (outside slits 10) are placed. Another alternative is to form, as shown in FIG. 7, both end portions 9a (10a) of each inside slit 9 (outside slit 10) in a circular shape having a diameter nearly double the width W1, and displace the center of the circular shape inward than the circle on which the inside slits 9 (outside slits 10) are placed. Another alternative is form, as shown in FIG. 8, both end portions 9a (10a) of each inside slit 9 (outside slit 10) in a circular shape having a diameter nearly double the width W1, and displace the center of the circular shape outward than the circle on which the inside slits 9 (outside slits 10) are placed.

(2) In each of the aforementioned embodiments, the number of inside slits 9 (outside slits 10) and the number of poles provided by the permanent magnets 8 are set to be equally eight, but these numbers may be increased or decreased as needed. Further, the number of inside slits (outside slits) may be a submultiple of the number of poles provided by the permanent magnets. Furthermore, when a relationship between the placement of the inside slits (outside slits) and the placement of the slots for magnets is appropriately defined, the increase of stress on the bridges between the slots can be further restrained and axial symmetry as a magnetic circuit can be maintained.

(3) In each of the aforementioned embodiments, the slits 9 and 10 are formed on double concentric circles respectively. An alternative is to form a plurality of slits arranged on each of triple or four concentric circles. The number of concentric circles may be increased or decreased as required.

INDUSTRIAL APPLICABILITY

The present invention can be utilized as, for example, a rotor of a motor to be mounted in an electric vehicle and others.

DESCRIPTION OF THE REFERENCE SIGNS

1 Rotor
2 Rotor core
3 Shaft-fastening hole
5 Rotor shaft
6 Inner circumferential bridge
7 Outer circumferential bridge
8 Permanent magnet
9 Inside slit
10 Outside slit
11 Inside bridge
12 Outside bridge
23 Thin annular portion
31 V groove
32 Angular key
36 Key groove
37 Key groove
38 Key

The invention claimed is:

1. A rotor including a rotor core, a shaft-fastening hole provided at a center of the rotor core, a plurality of slots provided in an outer circumferential portion of the rotor core, and magnets individually mounted in the slots,
    wherein the slots are arranged along an outer circumferential edge of the rotor core so that adjacent two slots are oriented in a reversed separated V shape or a separated V shape, each portion located in an interval between the adjacent slots forms an outer circumferential bridge located close to an outer circumference of the rotor core and an inner circumferential bridge located close to an inner circumference of the rotor core,
    wherein a plurality of slits each having an arc shape are formed at intervals on each of multiple concentric circles around the shaft-fastening hole and between the shaft-fastening hole and the slots of the rotor core, and the slits located on adjacent concentric circles are arranged so that the slits on one of the circles are placed to block portions located in the intervals between the slits on the other circle,
    wherein the portions located in the intervals between the slits formed on an outermost circle of the multiple concentric circles form a plurality of outside bridges and the portions located in the intervals between the slits formed on a circle positioned more inside than the outermost circle form a plurality of inside bridges, and
    the inside bridges are arranged in line, in a radial direction of the rotor core, with the outer circumferential bridges provided between the slots and the outside bridges are arranged in line, in the radial direction of the rotor core, with the inner circumferential bridges provided between the slots.

2. The rotor according to claim 1, wherein each of the slits has arc-shaped end portions at both ends in a longitudinal direction.

3. The rotor according to claim 1, further including a rotor shaft fastened in the shaft-fastening hole,
    wherein the rotor shaft is fitted in the shaft-fastening hole by protrusion and recess engagement.

4. The rotor according to claim 2, further including a rotor shaft fastened in the shaft-fastening hole,
    wherein the rotor shaft is fitted in the shaft-fastening hole by protrusion and recess engagement.

* * * * *